Jan. 31, 1961
A. J. MATHEIS
2,969,966
BUCKET MOUNTED FROST BREAKER
Filed July 23, 1957
2 Sheets-Sheet 1
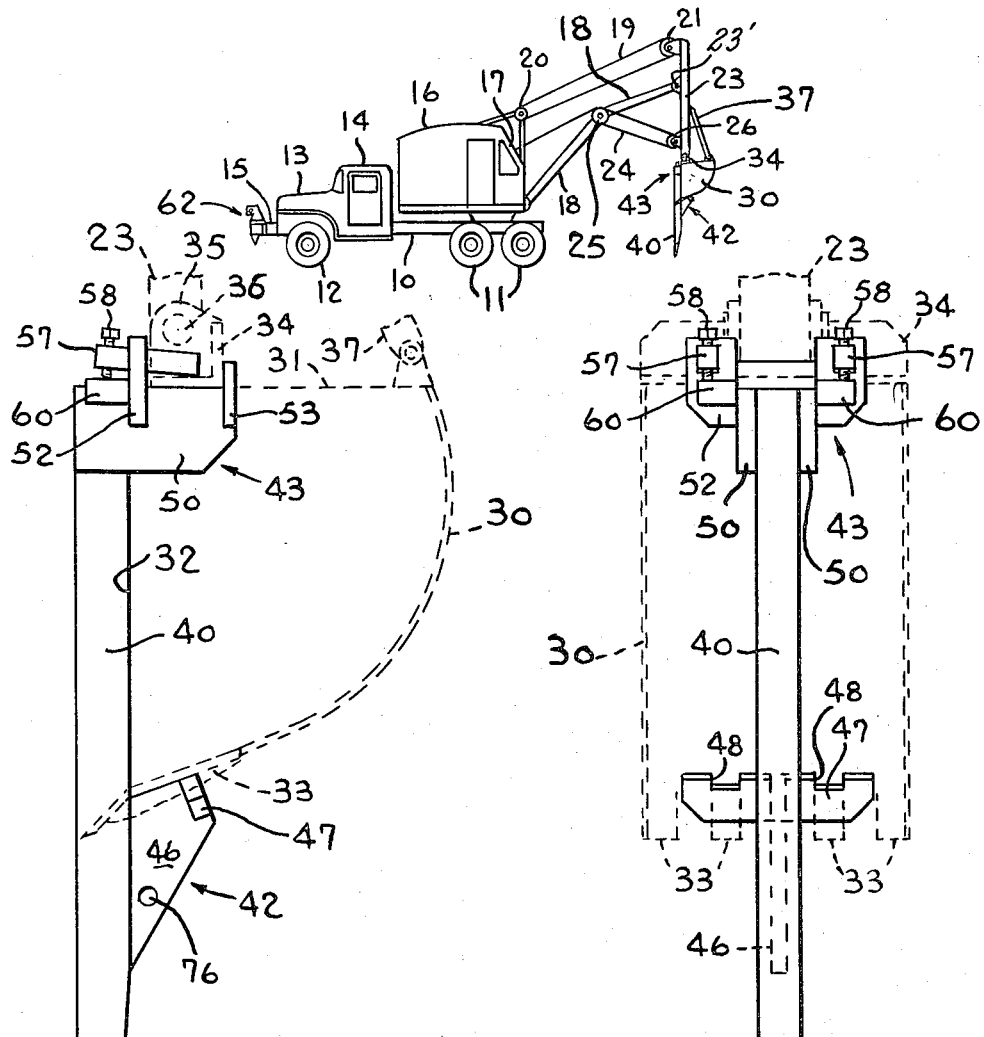
INVENTOR.
Aloys J. Matheis.
BY
Eugene O. Simpson
atty.

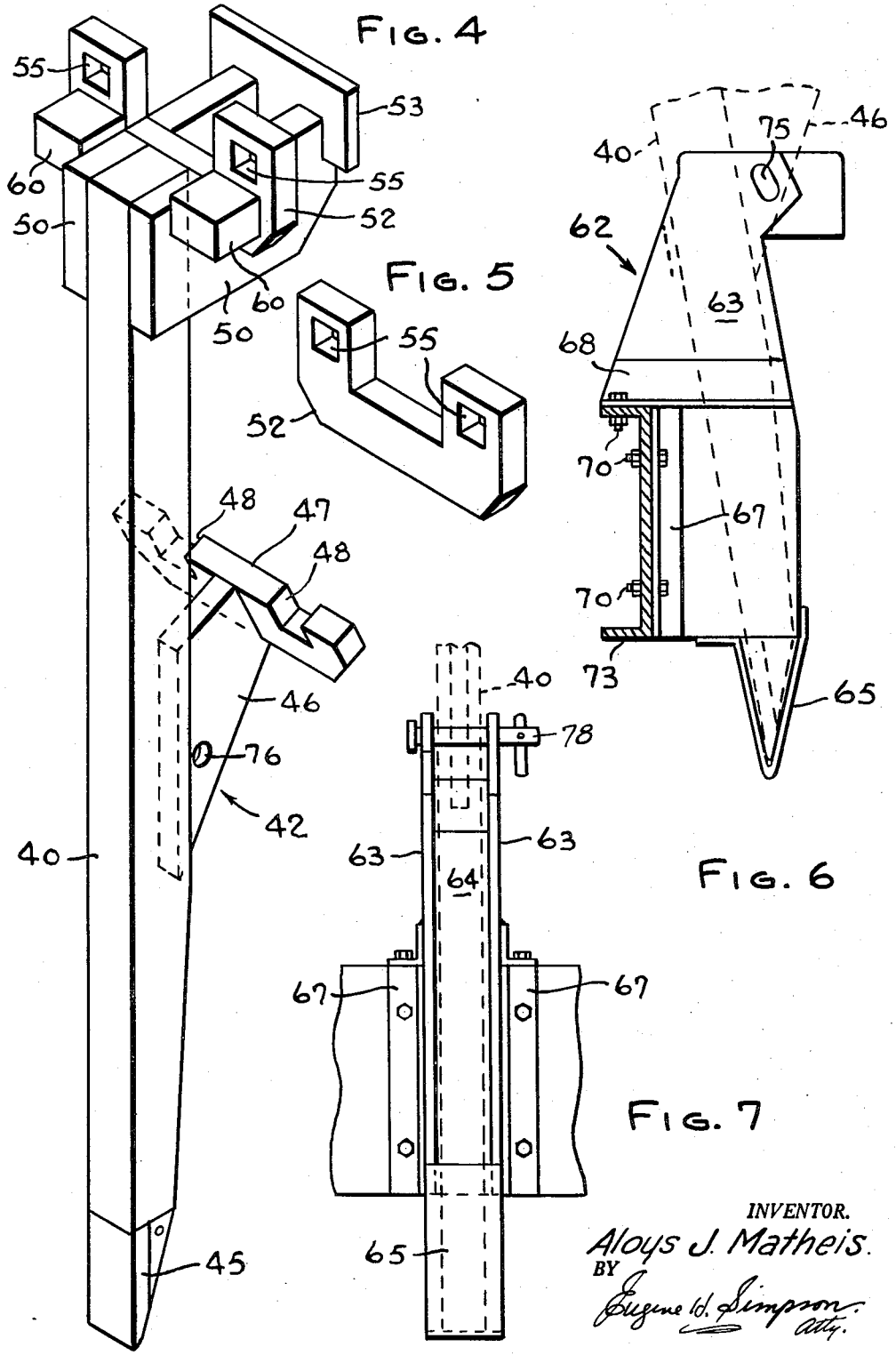

United States Patent Office

2,969,966
Patented Jan. 31, 1961

2,969,966

BUCKET MOUNTED FROST BREAKER

Aloys J. Matheis, 2455 N. Brookfield Road, Brookfield, Wis.

Filed July 23, 1957, Ser. No. 673,680

4 Claims. (Cl. 262—14)

This invention relates to frost breakers, or the like, adapted to break up frozen earth to permit excavating.

In construction work, it is sometimes necessary to excavate during the winter months when the ground is frozen down to depths of three or four feet or even deeper. In order to excavate under such conditions it is first necessary to break through the frost so that the shovel can operate successfully. Heretofore such work of breaking through heavy frost has been done largely by pneumatic drills which has proven costly.

It is an object of this invention to provide an ice or frost breaker adapted to be secured to a power shovel.

Another object is to provide an ice or frost breaker for attachment to a power shovel which will utilize the weight of the shovel bucket in breaking the frost.

Another object is to provide a frost or ice breaker for attachment to a power shovel which will utilize the weight of the power shovel and its supporting beams in breaking the frost.

A further object is to provide a frost or ice breaker adapted to be secured to a back hoe power shovel.

A still further object of the invention is to provide a frost or ice breaker adapted to be secured to a back hoe shovel substantially in alignment with the shovel post so as to utilize substantially the full weight of both the shovel and post in breaking the ice.

A further object of the invention is to provide a frost or ice breaker which may be attached or detached to a back hoe power shovel by the operator working alone.

A still further object of the invention is to provide a frost or ice breaker for use on a back hoe power shovel, which may be transferred readily from operating to carrying position.

A still further object of the invention is to provide a breaker adapted for use in breaking frosted or frozen earth or in breaking concrete or the like.

Still further objects will become apparent from the following specification which, when taken in conjunction with the accompanying drawings illustrates a preferred form of the invention.

In the drawings:

Fig. 1 is a view in side elevation of a back hoe power shovel showing the bucket with the frost breaker in place thereon;

Fig. 2 is an enlarged view in side elevation of the frost breaker per se and showing the bucket in broken lines;

Fig. 3 is a view of the frost breaker as seen from the left relative to Fig. 2, with the bucket, shown in broken lines, in place thereon;

Fig. 4 is an isometric projection of the frost breaker shown in Figs. 1–3 inclusive;

Fig. 5 is a perspective view of the locking yoke, as seen in Fig. 4;

Fig. 6 is a view in side elevation of the carrying bracket for the frost breaker, showing the frost breaker, in broken lines, in place therein; and Fig. 7 is a view of the bracket as seen from the right relative to Fig. 6, with the frost breaker shown in broken lines in place therein.

In the drawings, the shovel is of the back hoe type, shown in Fig. 1, and comprises a truck chassis 10 having four rear drive wheels 11 and a pair of front wheels 12. A truck motor is housed under a hood 13, and a cab 14, half the width of the truck, is mounted on the left side of the chassis to permit the shovel to be swung around to the front of the truck while traveling. The usual heavy bumper 15 protects the chassis from collisions, and is used as a carrier for the frost breaker.

The chassis 10 carries a power unit pivotally mounted thereon, the power unit (not shown) being in a housing 16 which also contains an operator's cab 17. The power unit platform carries a boom 18 pivotally mounted on a horizontal axis, the boom 18 being controlled vertically by a cable 19 operating on a pair of sheaves 20—21.

The outer end of the boom 18 has a shovel post or link 23 pivotally connected intermediate its ends thereof $23^1$. The shovel post 23 is likewise controlled by a cable 24 operating between sheaves 25—26. The cables 19 and 24 are both actuated from the power unit (not shown).

A bucket or back hoe 30, has an open top 31 and an open front loading face 32. The loading face of the bucket 30 has a plurality of spikes 33 along its lower edge which during normal loading operations in non-frosting weather, break earth being loaded in the shovel.

The shovel 30 has an angle iron 34 joining the sides of the shovel adjacent the junction of the upper open side or top 31 of the shovel and the open loading end or open front loading face 32 of the shovel. The angle iron 34 which provides a brace for the sides of the shovel at the open upper end or top 31 of the bucket also has a pair of relatively spaced parallel brackets 35 which receive a pin 36 to form a pivotal connection with the post 23 (Fig. 2). The bucket 30 is braced from the post 23 by brace rod or link 37 so as to retain the loading side of the bucket in substantial alinement with the post 23 at all times.

The frost breaker is shown in detail in Figs. 2, 3 and 4. Referring to those figures it will be seen that the frost breaker comprises a single long ram 40 to which are affixed a pair of brackets generally designated 42 and 43.

The ram is made, preferably, of a solid steel bar with a hardened steel point 45 at the lower end. The point 45 is made removable from the remainder of the ram so that it can be resharpened or replaced.

The lower bracket 42 may comprise a plate 46 extending laterally of the ram and having an upper edge sloping upwardly and outwardly and forming an acute angle with the upper end of the ram 40, to conform with the slope of the lower edge of the bucket when the ram is in place thereon. A brace or locking member 47 extending laterally of plate 46 upon opposite sides thereof is fixed to the outer edge of the plate 46 perpendicularly thereto. The bracket has a plurality of relatively spaced notches 48 (Figs. 3 and 4) cut therein to receive the spikes 33 on the lower edge of the bucket.

The upper bracket 43 is best shown in Figs. 2 and 4. Referring to those figures, the upper bracket comprises a pair of plates 50—50 which are welded one to each side of the ram 40 adjacent the upper end thereof. The plates 50—50 have a yoke 52 (Fig. 5), welded in a recess in the plates, the bottom of the yoke being flush with the tops of the plates. An end piece 53 is welded on the outer ends of the plates 50, the distance between the yoke 52 and the end piece being sufficient to receive the horizontal leg of the angle 34 (Fig. 2).

The yoke 52 has apertures 55—55 (Fig. 4) therein, the apertures 55 receiving clamping bars 57 (Fig. 3). The bars 57 receive clamping bolts 58 which are threadedly engaged with and extend through the clamping bars and seat on shelves 60, the shelves 60 being welded to both the side plates 50 and the yoke 52. The outer end of the clamping bar 57 seats on the upper surface of the horizontal leg of the angle iron 34 to clamp the ram 40 in place with the lower bracket 42 in place on the digging edge of the shovel 30.

The carrier, generally designated 62, for the frost breaker is shown in Figs. 6 and 7. Referring to those figures the carrier may comprise a pair of parallel guide plates 63—63 spaced apart a distance equal to the width of the ram 40 and retained in spaced relationship by a back spacer plate 64. A spike sheath 65 is welded onto the lower ends of the plates to receive the spike tip 45.

Angle irons 67 and 68 are fixed to the outer surface of each plate 63 and form attaching brackets for the carrier 62. Bolts 70 pass through the angle irons 67 and 68 and through the truck bumper 73 to secure the carrier in place.

Apertures 75 through the parallel sides or plates 63—63 and apertures 76 through the plate 46 on the ram 40 cooperate to receive a pin (see Fig. 7) to lock the ram in the carrier during periods of non use.

*Operation*

To start the frost breaking operation it may be assumed that the ram 40 is secured in the carrier 62 with a pin 78 passing through the apertures 75 and 76.

To connect the ram 40 to the bucket 30 the latter is swung around on the boom to position it adjacent the carrier 62 and lowered onto the upper end of the ram 40 with the digging edge of the bucket fitting over the bracket 42 and the spikes 33 on the bucket fitting within the recesses 48 in the brace 47.

The bucket 30 is then lowered onto the brace 47 with the angle iron 34 resting on the upper margins of the side plates 50—50 between the end piece 53 and the yoke 52. The locking blocks or bars 57 are then inserted in the apertures 55 and the clamping bolts 58 tightened to draw the two brackets 42 and 43 into engagement with the shovel.

The pin 78 is then removed and the shovel engine used to lift both the shovel and the ram from the carrier 62 and swing them into operating position at the rear of the truck.

The ram 40 may be dropped vertically on frosted ground and in so doing the full weight of the post 23, the full weight of the shovel or bucket 30 and half the weight of the boom 18 are added to the full weight of the ram in providing an effective frost breaker and causing the ram to penetrate either frost or concrete.

It will be realized that the hereinbefore described form of the invention is to be taken merely as a preferred embodiment thereof and that various changes in size, shape and arrangement of parts may be made without departing from the spirit of the invention or the scope of the appended claims.

That which is claimed as new and is desired to be secured by United States Letters Patent is:

1. The combination with a back hoe having relatively spaced sides defining an open front and dirt penetrating teeth in relatively spaced relation at its shovel end, said sides having means at said open front for attachment to a supporting member, said sides being connected by a member adjacent said open front and adjacent said means at the upper end of said hoe, of an elongated ram extending across said open front and having a leading edge below said hoe, said ram being attached to said hoe by means of a bracket receiving said teeth and engaging the exterior of said hoe adjacent said teeth and a clamping bracket engaging a side of said member corresponding to said exterior and including a clamp engaging the opposite side of said member whereby said ram extends across said open front in a line substantially parallel thereto.

2. A back hoe including a boom, a link pivotally connected to the free end of said boom, and a shovel secured to said link at a point spaced from said pivot and having a dirt receiving opening defined by relatively spaced sides each defined by a margin substantially in alignment with said link and a shovel edge having dirt penetrating teeth, in combination with a cross member connecting said sides adjacent said link and said margin at the upper end of said shovel, an elongated ram extending across said opening in alignment with said link and said margin and having a leading edge below said shovel, an aligning bracket on said ram having slots receiving said teeth on a side of said bracket opposite the said leading edge, said bracket extending below the exterior surface of said shovel adjacent said teeth, a clamping bracket on said ram adjacent said cross member and engaging a side thereof corresponding to said exterior surface of said shovel, and a manually operable clamp on said clamping bracket clampingly engaging the opposite side of said cross member.

3. In combination with a bucket having spaced side walls defining a dirt receiving opening, a shovel edge having dirt penetrating teeth at one end of said opening between said sides, and a cross member connecting said sides at the opposite end of said opening, said bucket having means for attachment to a support adjacent said opposite end, of a ram extending across said opening from one of said ends to the other of said ends adjacent said means and having a leading edge beyond said one end, a bracket on said ram engaging a side of said teeth and bucket exteriorly thereof, and a second bracket on said ram adjacent said cross member including manually operable clamping means releasably engaging said cross member.

4. In combination with a bucket having spaced side walls defining an open dirt receiving front and an open top, means adjacent said front and top for attachment to a support, the back wall of said bucket terminating in a shovel edge at the bottom of said open front and having dirt penetrating teeth, of a cross member connecting said sides adjacent said open front and said open top in proximity to said means, of a ram extending across said open front intermediate said walls, a bracket on said ram engaging the exterior of said shovel adjacent said teeth, and a clamping bracket on said ram adjacent said cross member releasably engaged therewith.

References Cited in the file of this patent

UNITED STATES PATENTS

| | | |
|---|---|---|
| 2,723,471 | Trundle | Nov. 15, 1955 |
| 2,726,463 | Rogers | Dec. 13, 1955 |
| 2,747,851 | Marsh | May 29, 1956 |
| 2,783,558 | Morgan | Mar. 5, 1957 |

FOREIGN PATENTS

| | | |
|---|---|---|
| 484,845 | Great Britain | May 11, 1938 |